United States Patent
Boeriswyl

(10) Patent No.: US 10,773,546 B2
(45) Date of Patent: Sep. 15, 2020

(54) WHEEL ASSEMBLY

(71) Applicant: TOYOTA MOTOR EUROPE, Brussels (BE)

(72) Inventor: Gautier Boeriswyl, Brussels (BE)

(73) Assignee: TOYOTA MOTOR EUROPE, Brussels (BE)

(*) Notice: Subject to any disclaimer, the term of this patent is extended or adjusted under 35 U.S.C. 154(b) by 83 days.

(21) Appl. No.: 15/766,093

(22) PCT Filed: Nov. 4, 2015

(86) PCT No.: PCT/EP2015/075725
§ 371 (c)(1),
(2) Date: Apr. 5, 2018

(87) PCT Pub. No.: WO2017/076445
PCT Pub. Date: May 11, 2017

(65) Prior Publication Data
US 2018/0281511 A1    Oct. 4, 2018

(51) Int. Cl.
*B60B 7/06* (2006.01)
*B60B 3/10* (2006.01)
(Continued)

(52) U.S. Cl.
CPC ............. *B60B 7/065* (2013.01); *B60B 3/10* (2013.01); *B60B 7/04* (2013.01); *B60B 7/08* (2013.01);
(Continued)

(58) Field of Classification Search
CPC .. B60B 7/065; B60B 7/18; B60B 7/08; B60B 7/04; B60B 3/10; B60B 2900/351; B60B 2310/318
(Continued)

(56) References Cited

U.S. PATENT DOCUMENTS

| 3,025,110 A | 3/1962 | Lyon |
| 2003/0141755 A1* | 7/2003 | Langgartner ............. B60B 1/08 301/65 |

(Continued)

FOREIGN PATENT DOCUMENTS

| EP | 0 475 915 A1 | 3/1992 |
| JP | S59-22002 U | 2/1984 |

(Continued)

OTHER PUBLICATIONS

May 23, 2019 Japanese Office Action issued in Japanese Patent Application No. 2018-541487.
(Continued)

*Primary Examiner* — S. Joseph Morano
*Assistant Examiner* — Jean W Charleston
(74) *Attorney, Agent, or Firm* — Oliff PLC

(57) ABSTRACT

A wheel assembly having an outboard portion and an inboard portion including a wheel hub configured to enable fastening of the wheel assembly to a vehicle such that the outboard portion is oriented away from a centerline of the vehicle and the inboard portion is oriented toward the centerline of the vehicle, a wheel rim positioned concentrically with the wheel hub, and configured to receive one or more friction elements, and one or more wheel spokes radially connecting the wheel hub and the wheel rim, each of the one or more wheel spokes having a retainer positioned at an inboard portion, the retainer being configured to enable retaining one or more decorative parts at an outboard portion of the wheel assembly.

20 Claims, 4 Drawing Sheets

(51) Int. Cl.
*B60B 7/04* (2006.01)
*B60B 7/08* (2006.01)
*B60B 7/18* (2006.01)

(52) U.S. Cl.
CPC .......... *B60B 7/18* (2013.01); *B60B 2310/318* (2013.01); *B60B 2900/351* (2013.01)

(58) Field of Classification Search
USPC .................................................. 301/37.102
See application file for complete search history.

(56) References Cited

U.S. PATENT DOCUMENTS

| | | | |
|---|---|---|---|
| 2008/0303338 A1* | 12/2008 | Takeda | B60B 7/14 301/104 |
| 2012/0013170 A1 | 1/2012 | Renius et al. | |
| 2012/0080932 A1 | 4/2012 | Ilse et al. | |
| 2013/0099555 A1 | 4/2013 | Loeb et al. | |
| 2014/0152078 A1 | 6/2014 | Noriega | |

FOREIGN PATENT DOCUMENTS

| | | | |
|---|---|---|---|
| JP | H07-205604 A | | 8/1995 |
| JP | H09-249001 A | | 9/1997 |
| JP | H11-115401 A | | 4/1999 |
| JP | 2001-071704 A | | 3/2001 |
| JP | 2008-302854 A | | 12/2008 |
| JP | 2008302854 A | * | 12/2008 |
| JP | 2009-119955 A | | 6/2009 |
| JP | 2015-98207 A | | 5/2015 |

OTHER PUBLICATIONS

Jul. 4, 2016 International Search Report issued in International Patent Application No. PCT/EP2015/075725.

Jul. 4, 2016 Written Opinion issued in International Patent Application No. PCT/EP2015/075725.

* cited by examiner

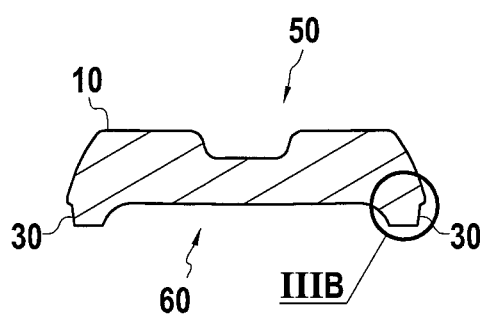
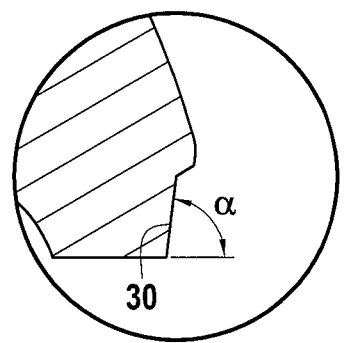
FIG.3A  FIG.3B
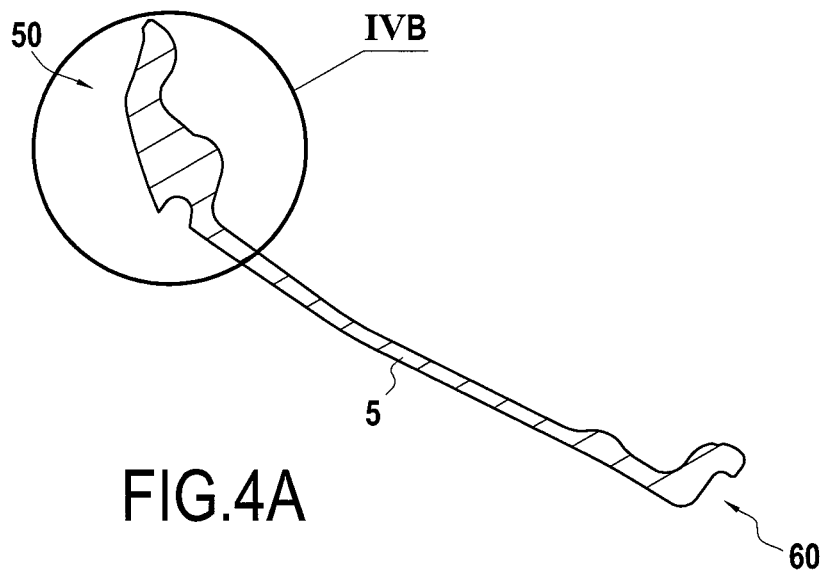
FIG.4A
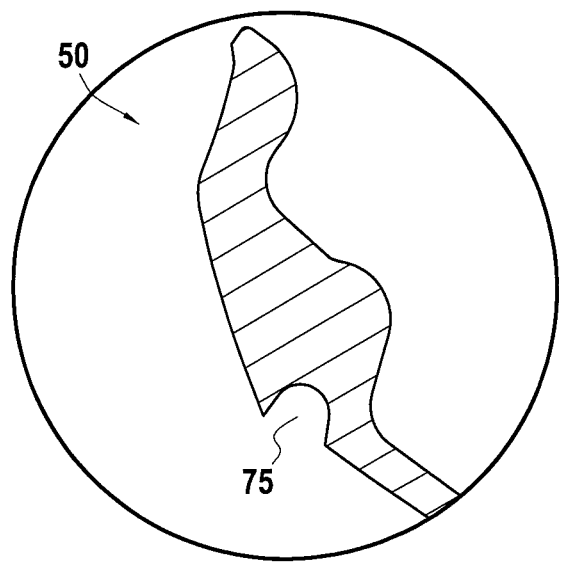
FIG.4B

WHEEL ASSEMBLY

FIELD OF THE DISCLOSURE

The present disclosure is related to vehicle wheel assemblies, and more particularly to a spoked wheel assembly enabling placement of decorative parts at a plurality of desired locations on the wheel assembly.

BACKGROUND OF THE DISCLOSURE

The desire to customize an automobile to one's own personal desires is almost as old as the automobile itself. From different paint colors to add-on accessories, owners and users of automobiles go to varying lengths to create a look they consider meets their desires.

One prominent area of an automobile having an impact on the look and design are the wheels. From the limited wood spoked wheels of early automobiles, to steel wheels with hubcaps, to alloy spoked wheels, automobile wheels have evolved into many varieties and configurations which modify the appearance of an automobile and may suit particular preferences.

In addition to the wheels themselves, decorative parts have been added to wheels in order to further change their appearance. For example, hubcaps have been used to cover, for example, steel wheel structures and lend greater aesthetic appeal. U.S. Pat. No. 3,025,110 discloses one such hubcap configured to attached to a pressed wheel assembly of an automobile.

Similarly, individual decoration parts have also been introduced and used to customize spoked wheel assemblies (e.g., alloy wheels). US 2013/0099555 discloses a wheel for a motor vehicle including at least one spoke, and a swallowtail profile disposed on the spoke. The wheel also includes a spoke module with swallowtail encompassing regions, which are configured to be pushed onto the swallowtail profile, thereby allowing for placement of a decoration part at a predetermined location.

EP 0 475 915 describes a motor vehicle wheel provided with an interchangeable decorative part to be directly applied to the wheel spokes. The outer surface of the decorative part can have an independent configuration other than the one of the inner portion which is applied to the spokes. The decorative part is affixed to the wheel by screws or bolts passed through fastening holes of the decorative part.

US 2012/0080932 describes a rim is provided for a motor vehicle wheel that includes a rim hub for fastening to a shaft and a plurality of rim struts each connected to the rim ring and to the rim hub. Between each two adjacent rim struts a cooling opening is formed, and the assembly includes a fastening for a releasable connection to a flow guide plate for guiding headwind.

SUMMARY OF THE DISCLOSURE

Currently, it remains desirable to provide a wheel assembly that allows an owner/operator greater flexibility for customizing a design of the wheel to suit the desires of the owner/operator. For example, the inventors of the present application have recognized that it is desirable to place one or more decorative parts at any number of locations on a wheel assembly, and not to be limited by locations of fastening holes and/or dovetail structures cast or machined on the wheel.

It has been determined that prior wheel assemblies, while allowing some level of customization, present limitations that may prevent an owner/operator of a vehicle from achieving a desired customization scheme.

Therefore, according to embodiments of the present disclosure, a wheel assembly having an outboard portion and an inboard portion is provided. The wheel assembly includes a wheel hub configured to enable fastening of the wheel assembly to a vehicle such that the outboard portion is oriented away from a centerline of the vehicle and the inboard portion is oriented toward the centerline of the vehicle, a wheel rim positioned concentrically with the wheel hub, and configured to receive one or more friction elements and one or more wheel spokes radially connecting the wheel hub and the wheel rim, each of the one or more wheel spokes comprising a retainer positioned at an inboard portion, the retainer being configured to enable retaining one or more decorative parts at an outboard portion of the wheel assembly.

The retainer may be configured to enable placement of one or more decorative parts at a plurality of positions radially along the wheel spoke.

By providing such a configuration, an owner/operator of a vehicle may place any number of decorative parts on a wheel assembly at any number of desired locations, and the decorative parts so placed may be retained for as long as the owner/operator wishes to maintain the design. At such time as a change in design becomes desirable, the owner/operator may change the configuration by removing and replacing decorative parts in a simple and effective manner.

The wheel assembly may include two or more wheel spokes radially connecting the wheel hub and the wheel rim, each of the two or more wheel spokes comprising the retainer located on an inboard portion, the retainer being configured to enable retaining the one or more decorative parts located at an outboard portion of the wheel assembly.

The retainer may include one or more profiles at an inboard portion of the wheel spokes. The one or more profiles may include one or more undercuts in the wheel spokes.

The one or more profiles may be a casted profile.

The one or more profiles may be a machined profiled.

The wheel assembly may include at least one of a fastener, a clamp, a clip, a magnet, and an adhesive. These may be used in conjunction with the retainer and retainer interface to further secure a decorative part in place, as desired.

The retainer and a retainer interface portion of the decoration part may be free of fasteners, clamps, magnets, and adhesives.

At least one protrusion may be positioned on at least one of the wheel rim, the wheel hub, and the wheel spoke so as to reduce an open area defined by the at least two spokes, the wheel hub, and the wheel rim.

The one or more decorative parts may be configured to abut the at least one protrusion when the one or more decorative parts are placed in a fully installed position.

The wheel rim may include at least one profile configured to cooperate with the retainer to enable positioning of the decorative part in the axial direction.

The profiles may be located at two opposite edges of each of the one or more wheel spokes.

The decorative part and the retainer may cooperate to form an interference fit.

The decorative part may be press fitted on to the retainer.

At least one recess may be formed on an inboard side of the at least one wheel spoke, the at least one recess being configured to prevent radial movement of a decorative part.

According to some embodiments, a vehicle comprising the wheel assembly according to the above described features may be provided.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

BRIEF DESCRIPTION OF THE DRAWINGS

FIG. 3A shows a cross-section of an exemplary wheel spoke taken along A-A of FIG. 1;

FIG. 3B shows a detail of the indicated portion of FIG. 3A;

FIG. 4A shows a cross-section of an exemplary wheel rim taken along B-B of FIG. 1;

FIG. 4B shows a detail of the indicated portion of FIG. 4A;

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
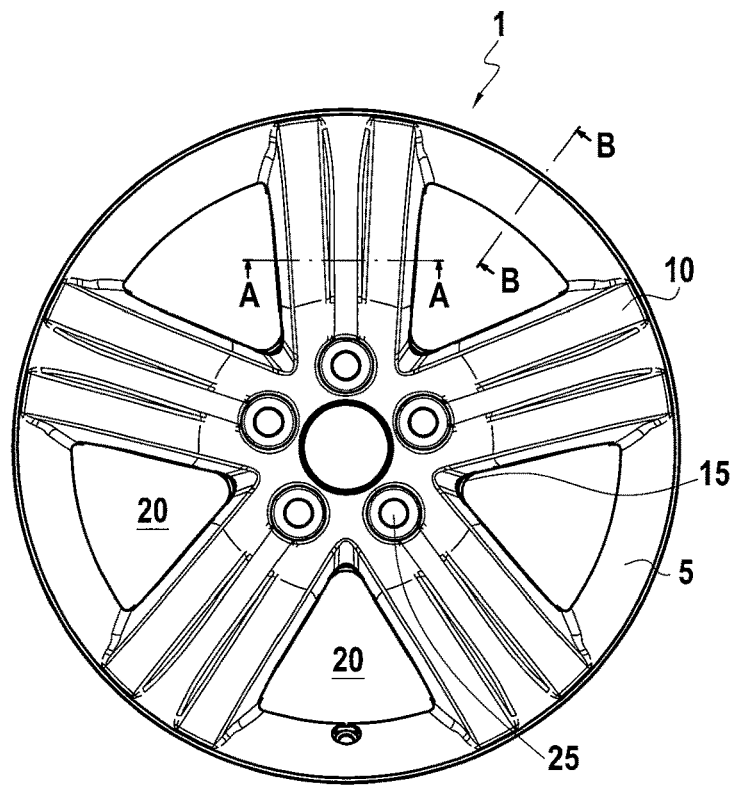
FIG. 1 shows a representation of an exemplary spoked wheel assembly 1 according to embodiments of the present disclosure.

FIG. 1 shows a representation of an exemplary spoked wheel assembly 1 according to embodiments of the present disclosure. Spoked wheel assembly 1 may include a wheel hub 15, a wheel rim 5, and one or more wheel spokes 10, among others. Wheel hub 15, wheel rim 5, and the one or more wheel spokes 10 may be cast, forged, molded, etc. Materials comprising wheel assembly 1 may include any suitable material, for example, iron, aluminum, steel, magnesium, titanium, carbon, alloys and combinations thereof, etc. Generally, wheel assembly 1 may be formed as a single, unitary piece, however, it is also possible that wheel hub 15, one or more wheel spokes 10, and wheel rim are assembled using methods such as, for example, welding.

Wheel hub 15 may be configured to enable fastening of wheel assembly 1 to a vehicle (not shown) such that an outboard portion 50 of wheel assembly 1 is oriented away from a centerline of the vehicle and an inboard portion 60 is oriented toward the centerline of the vehicle. In other words, when wheel assembly 1 is mounted on a vehicle, inboard portion 60 is generally not visible to an observer outside of the vehicle, while outboard portion 50 is visible to an outside observer looking at the vehicle.

Wheel hub 15 may include one or more lug holes 25 configured to permit wheel lugs associated with an axle of a vehicle and/or lug bolts associated with threaded holes of an axle of the vehicle to pass there through so as to firmly fasten wheel assembly 1 to a vehicle. Wheel hub 15 may be adapted or fitting over a portion of an axle associated with the vehicle, and may therefore be shaped accordingly. Importantly, as one of skill in the art will understand, embodiments of the present disclosure may be implemented with a wheel assembly affixed to an axle by wheel lugs and nuts, wheel bolts, any combination thereof, and any other mechanism for fixing a wheel to an axle of a vehicle.

Wheel rim 5 may be positioned concentrically with wheel hub 15, and configured to receive one or more friction elements (not shown), for example, tires. Wheel rim 5 may include additional features, for example a tire valve hole, configured to enable insertion of a filling valve for a tire installed on wheel rim 5.

One or more wheel spokes 10 may radially connect wheel hub 15 and wheel rim 5, and may positioned at predetermined angular intervals around a circumference of wheel assembly 1. For example, one or more wheel spokes 10 may be placed at intervals of 120 degrees, 90 degrees, 72 degrees, 60 degrees etc. One of skill in the art will recognize that, based on an angular interval a number of wheel spokes 10 may be determined. The number of wheel spokes 10 implemented for any particular design may take into account factors such as wheel balance, wheel loading, wheel aesthetic appearance, etc. when determining a predetermined angular interval between wheel spokes 10.

One or more wheel spokes 10 comprises at least one retainer 30 configured to interface with a retainer interface 31 of one or more decorative parts 12, 17, 21, so as to hold/retain decorative part 12, 17, 21 in an installed position at outboard portion 50 of wheel assembly 1. According to some embodiments, retainer features 30 may comprise a recessed portion located at or near an inboard portion 60 of wheel spoke 10. For example, each opposite edge of wheel spoke 10 may have an undercut portion positioned at or near inboard portion 60.

Figure 2:
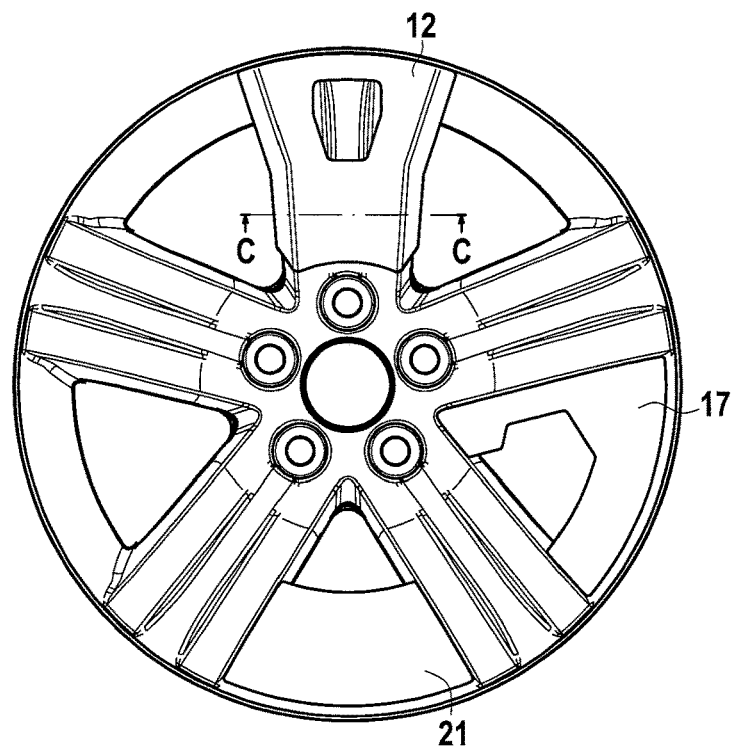
FIG. 2 shows the exemplary spoked wheel assembly of FIG. 1 with decorative parts affixed thereto in a manner according to embodiments of the present disclosure.

FIG. 2 shows exemplary spoked wheel assembly 1 with decorative parts 12, 17, 21 affixed thereto in a manner according to embodiments of the present disclosure. While FIG. 2 shows three decorative parts 12, 17, 21 affixed to wheel assembly 1, one of skill will recognize that this is exemplary only, and any number of decorative parts, ranging from 0 to 10 and above may be implemented as desired, space on wheel assembly 1 permitting. As will be described in greater detail below, wheel rim 5 may include one or more retainers 30 configured to enable adjustment and fastening of any number of decorative parts 12, 17, 21 in an axial and/or radial direction.

FIG. 3A shows a cross-section of an exemplary wheel spoke taken along A-A of FIG. 1 (i.e., without decoration part 12 installed), while FIG. 3B shows a magnified portion of the highlighted portion of FIG. 3A. As shown, retainer 30 may be implemented at or near an inboard portion 60 of wheel spoke 10 and may comprise a recess tapering from a narrow recess nearer outboard portion 50 to a wider recess approaching inboard portion 60. In other words, when viewed in cross-section as shown in FIG. 3A, an angle $\alpha$ is formed between a horizontal and the tapered edge of retainer 30 on wheel spoke 10. This angle $\alpha$ will be referred to herein as the "retainer angle."

Importantly, wheel spokes 10 may present any number of desired cross-sectional shapes, provided retainers 30 are positioned near an inboard portion 60. The cross sections presented herein are intended as exemplary only. For example, wheel spokes 10 may be solid or hollow, and may have various portions of material removed or added to provide a particular appearance.

Retainers 30 may be cast into wheel spoke 10 during the casting of wheel assembly 1, and/or may be machined (e.g., cut) on wheel spoke 10 during a subsequent process. For example, an aluminum/magnesium alloy wheel assembly 1 may be cast with retainers 30 formed on wheel spoke 10 by way of the shape used in the cast. Retainers 30 may then be machined to achieve a desired level of precision, e.g., for retainer angle α.

Retainer angle α may be configured to produce a desired level of retention between decorative part 12, 17, 21 and wheel assembly 1. For example, retainer angle α may be set between about 20 and 90 degrees, between 50 and 87 degrees, and even between 60 and 83 degrees.

One or more voids 20 may be created between two wheel spokes 10 (and between wheel rim 5 and wheel hub 15) with the size of such voids 20 being determined by the angular interval implemented between wheel spokes 10. Importantly, one or more voids 20 need not be of identical shape and may take any number of shapes as defined by variously designed wheel spokes 10.

According to some embodiments, decorative parts 17, 21 may be installed in voids 20 so as to create a desired appearance of wheel assembly 1. Such an installation may be performed as described herein, with decorative parts 17, 21 being fastened by retainers 30 on opposing wheel spokes 10 (i.e., between two or more wheel spokes).

Figure 6:
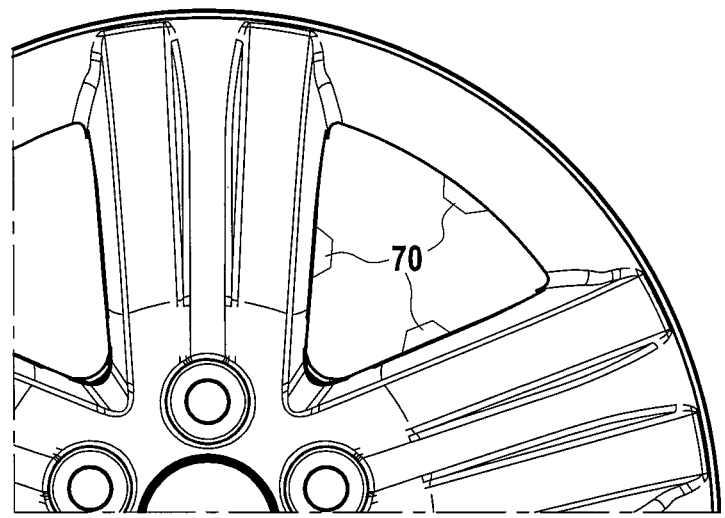
FIG. 6 shows another exemplary spoked wheel according to embodiments of the present disclosure.

As shown at FIG. 6, according to some embodiments, voids 20 may include one or more stoppers 70 configured to provide additional support for decorative parts 17, 21 installed in voids 20 (i.e., between two or more wheel spokes), for example, to prevent movement of a decorative part 17, 21 in an axial direction toward inboard portion 60. According to some embodiments, stoppers 70 may comprise protrusions provided on wheel rim 5, wheel spokes 10, and/or wheel hub 15 such that upon installation of decorative part 12, 17, 21, at least a portion of decorative part 12, 17, 15 abuts one or more stoppers 70, particularly in a fully installed position. According to other embodiments, even where stoppers 70 are present, a decorative part affixed to wheel assembly 1 need not abut a stopper 70.

Stoppers 70 may be formed of the same material as wheel assembly 1 and may be formed unitarily therewith. Alternatively, stoppers 70 may be formed of a different material than wheel assembly 1 and may be affixed to portions of wheel assembly 1 by any suitable methods, for example, welding, adhesives, fasteners (e.g., screws, bolts, clips, etc.)

Stoppers 70 may have any suitable shape, for example, half round, triangular, square, etc., and may be of any desirable size so as to provide a desired level of support for a decorative part to be installed and retained.

Depending on a desired configuration, stoppers 70 may be visible when viewing wheel assembly 1 from an outboard position, as shown at FIG. 6, or not visible from an outboard viewing position. Indeed, as one of skill in the art will understand, a portion of stoppers 70 may be visible and a second portion of stoppers 70 may be not visible when wheel assembly 1 is viewed from an outboard position.

Figure 7:
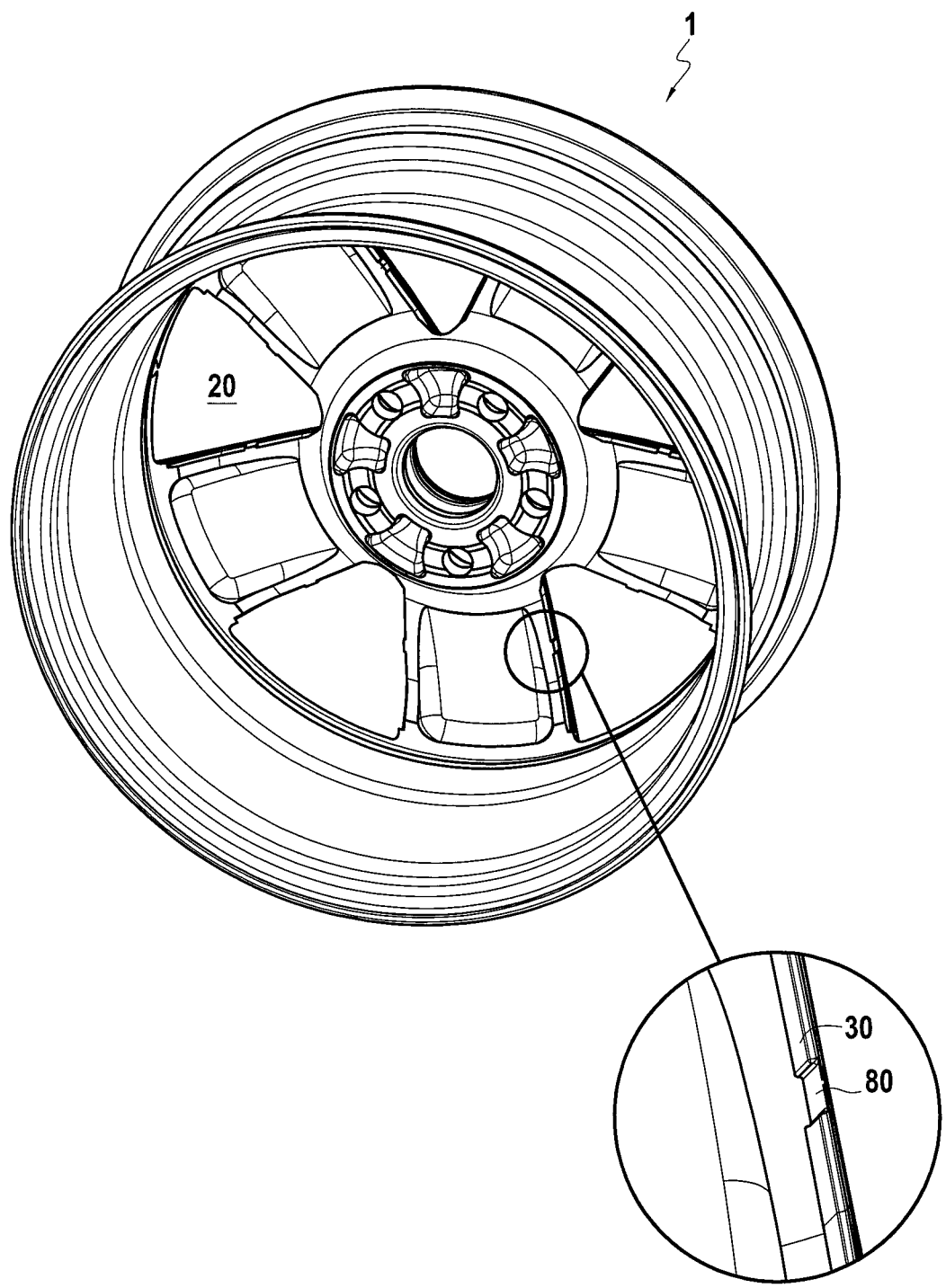
FIG. 7 shows an exemplary spoked wheel as viewed from an inboard side of the wheel assembly.

Importantly, stoppers 70 may be formed as a recess 80, as shown at FIG. 7. Such a configuration may enable structures present on a decorative part 12, 17, 21, to engage within the recess 80 and be prevented from moving, for example, radially by stopper 70.

Decorative parts 12, 17, 21 may be configured to be affixed to and/or between one or more wheel spokes 10, for example, superposing wheel spoke 10 and/or within void 20 (e.g., both superposing wheel spoke 10 and within void as with decorative part 17).

Figure 5:
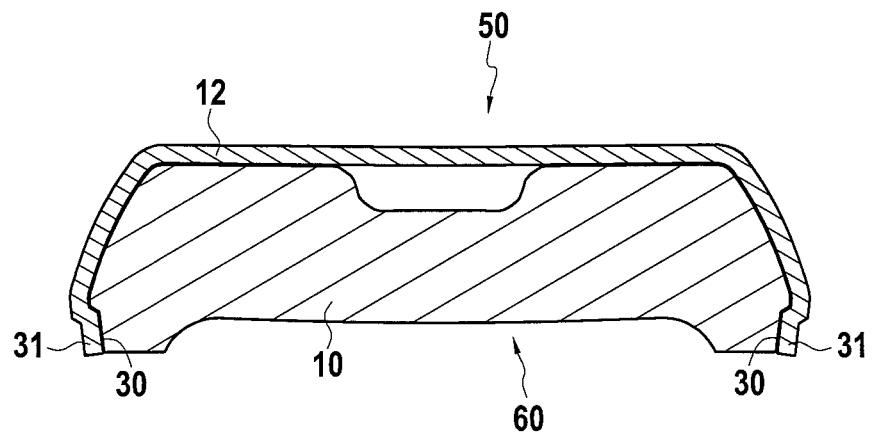
FIG. 5 shows a cross-section of an exemplary wheel spoke decorated with an exemplary decorative part taken along C-C of FIG. 2.

FIG. 5 shows a cross-section of an exemplary wheel spoke superposed by an exemplary decorative part 12, the cross-section being taken along C-C of FIG. 2.

Decorative parts 12, 17, 21 may be of any desirable shape and cross-section, provided that decorative parts 12, 17, 21 include a retainer interface 31 configured to interface with retainers 30 of one or more wheel spokes 10. Retainer interface 31 may be configured to engage one or more portions of retainer 30 to cause a detachable connection between decorative part 12, 17, 21 and wheel assembly 1. For example, a contour of retainer interface 31 on a decorative part 12, 17, 21 may be configured to follow a contour of retainer 30 on wheel spoke 10, thereby resulting in engagement of retainer interface 31 with retainer 30. One of skill in the art will recognize that a force for causing detachment of an installed decorative part 12, 17, 21 may be configured as desired and based on ergonomic standards available as of the filing of the present application.

According to some embodiments, edges of decorative parts 12, 17, 21 may be configured to produce a biasing force when installed on wheel assembly 1. For example, where retainers 30 are provided on opposite sides of wheel spoke 10, a decorative part 12 for superposition over wheel spoke 10 may have opposing edges that extend toward one another at a predetermined angle. When fit on wheel spoke 10 and retainer interfaces 31 engaged with retainer 30, the opposing edges of decorative part 12 may generate a biasing force toward one another to return to an at-rest position of decorative part 12.

Similarly, for decorative parts 17, 21 installed between two or more wheel spokes 10, a biasing force may be oriented away from a centerline of decorative part 17, 21, such that when installed in void 20, retainer interfaces 31 are biased toward retainers 30 of opposite wheel spokes 10.

One of skill will understand that variations on such a configuration may be implemented to cause, for example, an interference fit of decorative parts 12, 17, 21 on wheel assembly 1. According to some embodiments, decorative parts 12, 17, 21 may be press fit on to wheel assembly 1 at desired locations. In such a case, attachment of decorative parts 12, 17, 21 to wheel assembly 1 may be substantially permanent, absent tools typically associated with a mechanic or service center.

As desired, additional means for adhering decorative parts to wheel assembly 1 may be used. For example, any of adhesives, fasteners (e.g., screws, clips, bolts, clamps, etc.), magnets, etc., may be positioned at or near retainer interface 31 and retainer 30, or even at other various desirable positions on decorative parts 12, 17, 21, and/or wheel assembly 1. According to some embodiments, magnets may be provided at retainers 30, with opposite pole magnets provided on retainer interfaces 31 such that additional retaining forces are generated when decorative part 12, 17, 21 is installed on wheel assembly 1. Of course, one of skill will recognize in view of the present disclosure that configurations are possible where no additional means for adhering decorative parts 12, 17, 21 are provided, and retention is based solely on interaction between retainer 30 and retainer interface 31.

Decorative parts 12, 17, 21 may be fabricated of any suitable material. According to some embodiments, decorative parts may be fabricated from a thermoplastic material and may be injection molded. Alternatively, decorative parts may be fabricated from metal and may be stamped, cut, and/or machined.

Overmolding of decorative parts 12, 17, 21 may also be performed to achieve a desired appearance of decorative parts 12, 17, 21. For example, decorative part 12, 17, 21 may be fabricated from metal and subsequently overmolded with a thermoplastic material to provide a desired appearance (e.g., scaling), or to provide a suitable surface for customization (e.g., painting). One of skill in the art will recognize that a plastic decorative part 12, 17, 21, may also be overmolded, and multiple overmolding processes may be performed to achieve a desired appearance.

FIG. 4A shows a cross-section of an exemplary wheel rim taken along B-B of FIG. 1, and as also shown at FIG. 4B, according to some embodiments, wheel rim 5 may include at least one rim profile 75, for example, positioned at an outboard portion 50 of wheel assembly 1, and configured to cooperate with retainer 30 to enable positioning of the decorative part, for example, in the axial direction and/or radial direction.

Rim profile 75 may comprise a recess, cast and/or machined in wheel rim 5, and may have any suitable shape to aid in achieving its purpose. For example, rim profile 75 may be half round, quarter round, rectangular, triangular, etc., and configured to interact with a rim interface (not shown) of decorative part 12, 17, 21.

Returning to FIG. 2, decorative parts 17, 21 may include portions configured to interact with rim profile 75, so as to provide additional retention characteristics. For example, a bead may be provided on decorative parts 17, 21 that may be inserted (e.g., snapped) into rim profile 75. One of skill will recognize that other suitable interactions between decorative part 17, 21 may be implemented.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A wheel assembly having an outboard portion and an inboard portion, comprising:
   a wheel hub configured to enable fastening of the wheel assembly to a vehicle such that the outboard portion is oriented away from a centerline of the vehicle and the inboard portion is oriented toward the centerline of the vehicle;
   a wheel rim positioned concentrically with the wheel hub, and configured to receive one or more friction elements; and
   one or more wheel spokes radially connecting the wheel hub and the wheel rim, each of the one or more wheel spokes comprising a retainer positioned at the inboard portion, the retainer being configured to enable retaining one or more decorative parts at the outboard portion of the wheel assembly such that the decorative pail remains in contact with the one or more wheel spokes from the outboard portion to the inboard portion.

2. The wheel assembly according to claim 1, wherein the wheel assembly comprises two or more wheel spokes radially connecting the wheel hub and the wheel rim, each of the two or more wheel spokes comprising the retainer located on the inboard portion, the retainer being configured to enable retaining the one or more decorative parts located at the outboard portion of the wheel assembly.

3. The wheel assembly according to claim 2, wherein at least one protrusion is positioned on at least one of the wheel rim, the wheel hub, and the wheel spoke so as to reduce an open area defined by the at least two spokes, the wheel hub, and the wheel rim.

4. The wheel assembly according to claim 3, wherein the one or more decorative parts are configured to abut the at least one protrusion when the one or more decorative parts are placed in a fully installed position.

5. The wheel assembly according to claim 1, wherein the retainer comprises one or more profiles at an inboard portion of the wheel spokes.

6. The wheel assembly according to claim 5, wherein the one or more profiles comprise one or more undercuts in the wheel spokes.

7. The wheel assembly according to claim 5, wherein the one or more profiles comprise a casted profile.

8. The wheel assembly according to claim 5, wherein the one or more profiles comprise a machined profiled.

9. The wheel assembly according to claim 5, wherein the wheel assembly further includes at least one of a fastener, a clamp, a clip, a magnet, and an adhesive.

10. The wheel assembly according to claim 9, wherein the retainer and a retainer interface portion of the decoration part are free of fasteners, clips, clamps, magnets, and adhesives.

11. The wheel assembly according to claim 5, wherein the profiles are located at two opposite edges of each of the one or more wheel spokes.

12. The wheel assembly according to claim 1, wherein the wheel rim comprises at least one profile configured to cooperate with the retainer to enable positioning of the decorative part in the axial direction.

13. The wheel assembly according to claim 1, wherein the decorative part and the retainer cooperate to form an interference fit.

14. The wheel assembly according to claim 1, wherein the decorative part is press fit on to the retainer.

15. The wheel assembly according to claim 1, wherein at least one recess is formed on an inboard side of the at least one wheel spoke, the at least one recess being configured to prevent radial movement of a decorative part.

16. A vehicle comprising the wheel assembly according to claim 1.

17. The wheel assembly according to claim 1, wherein:
the retainer comprises a recess tapering from a narrow recess nearer to the outboard portion to a wider recess approaching the inboard portion, and
a retainer angle is formed between a horizontal plane and a tapered edge of the retainer.

18. The wheel assembly according to claim 17, wherein the retainer angle is between 60 and 83 degrees.

19. A wheel assembly having an outboard portion and an inboard portion, comprising:
a wheel hub configured to enable fastening of the wheel assembly to a vehicle such that the outboard portion is oriented away from a centerline of the vehicle and the inboard portion is oriented toward the centerline of the vehicle;
a wheel rim positioned concentrically with the wheel hub, and configured to receive one or more friction elements; and
one or more wheel spokes radially connecting the wheel hub and the wheel rim, each of the one or more wheel spokes comprising a retainer positioned at the inboard portion, the retainer being configured to enable retaining one or more decorative parts at the outboard portion of the wheel assembly, wherein:
the retainer comprises a recess tapering from a narrow recess nearer to the outboard portion to a wider recess approaching the inboard portion, and
a retainer angle is formed between a horizontal plane and a tapered edge of the retainer.

20. The wheel assembly according to claim 19, wherein the retainer angle is between 60 and 83 degrees.

\* \* \* \* \*